United States Patent [19]

Gilson

[11] Patent Number: 4,834,867
[45] Date of Patent: May 30, 1989

[54] A PROCESS FOR PRODUCING GASOLINE UNDER FCC CONDITIONS EMPLOYING A CRACKING CATALYSTS HAVING AROMATIC SELECTIVITY

[75] Inventor: Jean-Pierre Gilson, Columbia, Md.

[73] Assignee: W. R. Grace & Co.-Conn., New York, N.Y.

[21] Appl. No.: 98,100

[22] Filed: Sep. 17, 1987

Related U.S. Application Data

[62] Division of Ser. No. 899,572, Aug. 25, 1986.

[51] Int. Cl.$^4$ ............................................. C10G 11/04
[52] U.S. Cl. .................................. 208/120; 585/739; 502/60; 502/61
[58] Field of Search ................... 208/120; 502/61, 60; 585/739

[56] References Cited

U.S. PATENT DOCUMENTS

| | | | |
|---|---|---|---|
| 3,308,069 | 3/1967 | Wadlinger et al. | 208/120 |
| 4,309,280 | 1/1982 | Rosinski et al. | 208/120 MC |
| 4,415,440 | 11/1983 | Roberts et al. | 200/120 |
| 4,481,104 | 11/1984 | Walsh | 502/64 |
| 4,550,218 | 10/1985 | Chin | 208/120 |
| 4,554,398 | 11/1985 | Barthomerif et al. | 208/310 Z |
| 4,612,108 | 9/1986 | Angwine et al. | 208/120 |
| 4,620,921 | 11/1986 | Chang et al. | 208/120 |
| 4,676,887 | 6/1987 | Fischer et al. | 208/61 |
| 4,756,822 | 7/1988 | Chen et al. | 208/111 |

FOREIGN PATENT DOCUMENTS 0055529 7/1982 European Pat. Off. ............ 208/120

*Primary Examiner*—H. M. S. Sneed
*Assistant Examiner*—Helane Myers
*Attorney, Agent, or Firm*—Edward J. Cabic

[57] ABSTRACT

An FCC catalyst is made with a zeolite Beta which contains from about 0.1 to 15 wt % based on the weight of the zeolite Beta of gallium, zinc or mixtures thereof. The catalyst substantially increases the aromatic content of the gasoline compared to just using a catalyst of zeolite Beta. The catalyst can also be made with an inorganic oxide binder for the metal modified zeolite Beta and other catalytically active zeolite components.

11 Claims, No Drawings

A PROCESS FOR PRODUCING GASOLINE UNDER FCC CONDITIONS EMPLOYING A CRACKING CATALYSTS HAVING AROMATIC SELECTIVITY

This is a division, of application Ser. No. 899,572, filed Aug. 25, 1986.

BACKGROUND OF THE INVENTION

1. Field of the Invention

This invention relates to a metal modified Beta zeolite for use in fluid catalytic cracking.

2. Description of the Previously Published Art

In the field of fluid catalytic cracking, FCC, the faujasite family of zeolites (synthetic X and Y zeolites) is used to provide high activity high gasoline yield catalysts. Modification of faujasite type zeolites, such as by steam dealumination, allows the refiner to achieve high selectivity for high octane hydrocarbons. This selectivity toward higher octane gasoline is due primarily to an increase in olefins in the gasoline. Although other zeolites, such as ZSM-5 can be added to existing faujasite based FCC catalysts in order to further increase the proportion of high octane hydrocarbons, no zeolite has yet commercially replaced the faujasite zeolites as the major component of an active FCC catalyst.

Zeolite Beta has been shown to be a superior octane enhancing FCC catalyst by G. C. Edwards and A. W. Peters in U.S. patent application Ser. No. 842,519, filed Mar. 21, 1986. The higher octane gasoline is again due to a dramatic increase in the olefin content of the gasoline.

D. E. Walsh in U.S. Pat. No. 4,481,104 discloses the use of a modified zeolite Beta in FCC. The modification, which is a strong dealumination, permits good selectivity for distillate production. The patent does not disclose that aromatics can be made with the catalyst.

In another development, A.H.P. Hall in European patent No. 162,636 discloses the use of gallium loaded zeolites such as ZSM-5 as a way to transform propane and propene into aromatics. T. Mole et al, in Applied Catalysis, volume 17, pages 141-154 (1985) discuss the use of Zn-ZSM-5 as a catalyst in the production of aromatics from propane. Hall and Mole do not discuss, however, the use of Ga or Zn exchanged zeolites in general, and in particular the use of Ga or Zn exchanged Beta in the catalytic cracking of gas-oil or other feedstocks commonly used in FCC.

Plank et al in U.S. Pat. No. 4,157,293 disclose adding zinc to ZSM-5 series zeolites to prepare aromatic compounds from $C_2$-$C_{10}$ paraffins and olefins. Again, they do not discuss the use of Ga or Zn exchanged zeolites in general, and in particular the use of Ga or Zn exchanged zeolite Beta in the catalytic cracking of gas-oil or other feedstocks commonly used in FCC.

Beta zeolite is a known zeolite which has been described in U.S. Pat. No. 3,308,069. Various metals such as Pd, Pt, Co, Mo, Ni and W have been exchanged with zeolite Beta to produce catalysts for hydroisomerization, hydrocracking, and hydrodewaxing. See U.S. Pat. No. 4,568,655, EP No. 140,608, U.S. Pat. No. 3,923,641 and UK application No. 2,141,733 A. However, these catalytic reactions are done under completely different conditions than FCC. Beta zeolite can also be used as an adsorbent for the separation of $C_9$ aromatic isomers. See U.S. Pat. No. 4,554,398.

3. Objects of the Invention

It is an object of this invention to produce and use a metal loaded Beta zeolite as a very effective catalyst to increase the aromatic content of the FCC gasoline which is produced without the need of an external hydrogen pressure.

It is a further object of this invention to produce and use a gallium loaded Beta zeolite as a very effective catalyst to increase the aromatic content of FCC gasoline.

It is a further object of this invention to produce and use a zinc loaded Beta zeolite as a very effective catalyst to increase the aromatic content of FCC gasoline.

SUMMARY OF THE INVENTION

An FCC catalyst has been made by adding to zeolite Beta either gallium, Ga, or zinc, Zn, in an amount of from about 0.1 to 15 wt % based on the weight of the zeolite. Such a metal loaded catalyst shows a significant improvement over the pure zeolite Beta in the cracking of gas-oil feedstocks under FCC conditions. The production of aromatics gives an especially valuable contribution to the octane number of the gasoline produced. The small catalyst particles which are generally less than 200 micrometers can be made with an inorganic oxide binder and additional catalytically active zeolites can be added.

DESCRIPTION OF THE PREFERRED EMBODIMENTS

In a preferred embodiment zeolite Beta is ion exchanged with Zn or Ga and, when used as an FCC catalyst, dramatic changes occur in the product distribution of the WTHGO cracking as shown in Table 1 following Examples 5-8. The amount of paraffins is decreased, the amount of olefins is decreased, and the amount of aromatics is greatly increased in the gasoline fraction. For the Ga-exchanged Beta catalyst the total aromatic yield increases by 28% over the catalyst containing the non metal loaded H-Beta and by 38% for the Zn-exchanged Beta catalyst.

Although ion exchange is the preferred method to introduce metal ions in zeolites, other conventional loading techniques can also be used. For example, impregnation can be used by filling up the pores of a catalyst with a metal salt solution and then evaporating the solvent. Other techniques include adsorption from solution, co-precipitation, and deposition to introduce the Ga or Zn ion onto the zeolite Beta catalyst. Such techniques, well known to those skilled in the art are described, for instance, in the article by G. J. K. Acres et al in "CATALYSIS—Vol 4", pp 1-30 (1981), The Royal Society of Chemistry, London (U.K.).

The Beta zeolite is a known synthetic zeolite and it is described in U.S. Pat. No. 3,308,069. Other procedures can be used to make the zeolite and the synthesis can be tailored to produce either large or small size particles. It is believed the Beta zeolite can be used in any particle size.

The amount of Ga, Zn or mixtures thereof added can vary. A minimum effective amount appears to be about 0.1 wt % based on the weight of the zeolite. Since Ga is quite expensive one wishes to use as little as needed. Loadings on the order of 1 or 2 wt % appear to be adequate and from an economic point of view it appears there would be no need to exceed 15 wt %. Although zinc is not as expensive, it again appears there is no need to use more than about 15 wt % based on the weight of the zeolite since there does not appear to be any substantial additional catalytic reaction benefit at higher zinc loadings.

The catalyst compositions can contain from about 1 to 80 percent by weight, and preferably from 5 to 40 percent by weight of the metal loaded zeolite admixed with conventional FCC catalyst forming components such as inorganic oxide matrix binder components. Such a binder can include one or more inorganic binders such as silica, alumina, silica-alumina sols and gels, clay, and particulate alumina, although the binder need not be limited to the aforementioned. It is also contemplated that additional catalytically active zeolite components such as, but not only, type Y faujasite, ultrastable Y, rare-earth and calcined rare-earth exchanged Y, PCY (which is a partially rare-earth exchanged thermally treated Y zeolite as described in U.S. Pat. No. 3,595,611), and mixtures thereof may be included along with zeolite Beta in the preparation of the catalysts contemplated herein.

In a preferred method for preparing catalysts of the present invention, the metal loaded zeolite Beta is combined with a silica sol or alumina sol binder such as Ludox or aluminum chlorhydrol, clay and sufficient water to form a pumpable slurry, which is then spray dried at temperatures of about 150° to 350° C. to obtain particles in the fluidizable size range of generally less than about 200 micrometers and more preferably from about 30 to 120 micrometers. Typically preferred compositions contain about 5 to 40 weight percent zeolite Beta, about 15 to 40 percent $SiO_2$ or $Al_2O_3$ sol binder, and the balance clay. Additional preferred compositions will also include particulate alumina, silica alumina hydrogel, and catalytically active zeolites, as disclosed in U.S. Pat. Nos. 3,293,192, 3,595,611, 3,402,996, 3,607,043, 3,676,368 and 3,702,886, and mixtures thereof.

The metal loaded Beta zeolite catalysts according to the present invention can be used in an FCC process to make higher aromatic content gasoline. Typical reaction conditions are a reaction temperature of 455° C. to 565° C., at a pressure of between about 0 and 4 atmospheres and a WHSV of between about 20 to 200 $h^{-1}$.

Having described the basic aspects of our invention, the following examples are given to illustrate specific embodiments thereof.

EXAMPLE 1

This example describes the preparation of zeolite Beta which will be used in making the catalyst according to the present invention.

Zeolite Beta was prepared according to the teaching of U.S. Pat. No. 3,308,069. The X-ray powder diffraction pattern matched that of zeolite Beta described in the aforementioned patent.

The zeolite was then calcined for two hours at 550° C. to remove the organic template and thus free the internal volume of the zeolite.

The zeolite Beta was then ion exchanged with a 10% solution of $(NH_4)_2SO_4$ at 90° C. for one hour, washed free of sulfate and dried two hours at 110° C.

The ion exchanged zeolite was then placed in a furnace and heated to 120° C. At this point, steam was introduced in the furnace and the temperature increased at 15° C. per min to 732° C. The zeolite was then steamed for two hours at 732° C. in an atmosphere containing 100% steam.

EXAMPLE 2

This example describes the preparation of a catalyst containing zeolite beta.

17.2 g of the zeolite Beta prepared in Example 1 was mixed intimately with 64.25 g of Ludox AS-40 (40% $SiO_2$), oven dried at 120° C. and screened through 30 mesh. The catalyst was thereafter calcined at 550° C. for 2 hours. This catalyst contains 40% zeolite Beta.

EXAMPLE 3

This example describes the gallium exchange of zeolite Beta and the catalyst preparation thereof according to the present invention.

Eight grams of zeolite Beta prepared and activated as described in Example 1 were exchanged with a Ga $(NO_3)_3$ solution for 1 hour at 90° C. The exchange was repeated three times and the weight ratio of the ion exchange slurry was 1 part zeolite, 1 part salt, and 5 parts water.

This ion exchanged zeolite Beta was then made into a catalyst containing 40% Beta as follows: 30 g of NALCO 2326 Silica Sol (40 wt % $SiO_2$), were mixed with 8 g of Beta, oven dried at 120° C., screened through 30 mesh and then calcined for 2 hours at 550° C. This catalyst contained 1.64 wt % Ga.

EXAMPLE 4

This example describes the zinc exchange of zeolite Beta and catalyst preparation thereof.

Ten grams of zeolite Beta prepared and activated as described in Example 1 were exchanged with a Zn $(NO_3)_2$ solution for ½ hour at 80° C. The exchange was repeated three times and the weight ratio of the ion exchange slurry was 1 part zeolite, 1 part salt, and 5 parts water. The zeolite Beta so prepared contained 1.14% Zn.

This ion exchange zeolite Beta was then made into a catalyst containing 40% zeolite using the procedure described in Example 2.

EXAMPLES 5-8

These examples describe the comparison testing with gas oil cracking of zeolite Beta, two metal exchanged Beta zeolites according to the present invention and a commercially available high octane catalyst.

A sample of the catalyst containing zeolite Beta described in Example 2 was used in the cracking of WTHGO (West Texas Heavy Gas Oil) in a microactivity unit similar to the one described by F. G. Ciapetta and D. S. Henderson in their article "Microactivity Test for Cracking Catalysts," published in OIL AND GAS JOURNAL, Vol. 65, October 16, 1967. The temperature in the reaction zone was 499° C., the space velocity (WHSV) was 16.0 $h^{-1}$ and the catalyst to oil ratio (c/o) was 3.0. The Ga-Beta catalyst described in Example 3 and the Zn-Beta catalyst described in Example 4 were also tested along with a commercially available high octane catalyst as an example of the present state of the art in high octane FCC catalysts. The degree of conversion and a product analysis performed on a capillary GC column are shown in Table 1.

TABLE 1

Composition of Gasoline from Catalysts Containing Zeolite Beta

| Catalyst | Example 5 H-Beta | 6 Ga-Beta | 7 Zn-Beta | 8 Commercially Available High Octane Catalyst |
|---|---|---|---|---|
| % Zeolite | 40 | 40 | 40 | 40 (Z-14 USY) |
| Conversion (Wt %) | 59.9 | 59.4 | 59.3 | 58.0 |
| Light Gasoline Composition: $C_5 + C_6$ (Wt %) | | | | |
| Paraffins | 10.1 | 5.9 | 5.6 | 7.4 |
| Olefins | 20.6 | 18.2 | 14.9 | 11.2 |
| Naphtenes | 1.2 | 0.6 | 0.8 | 1.7 |
| Aromatics | 2.5 | 1.8 | 2.1 | 1.4 |
| Total | 34.4 | 26.5 | 23.4 | 21.7 |
| Heavy Gasoline Composition: $C_7 - C_{12}$ (Wt %) | | | | |
| Paraffins | 10.4 | 8.6 | 8.1 | 18.0 |
| Olefins | 11.8 | 10.2 | 10.9 | 7.2 |
| Naphtenes | 5.2 | 4.0 | 3.8 | 7.9 |
| Aromatics | 32.0 | 42.3 | 45.5 | 32.2 |
| Total | 59.4 | 65.1 | 68.3 | 65.3 |
| Total Olefins | 32.4 | 28.4 | 25.8 | 18.4 |
| Aromatics | 34.5 | 44.1 | 47.6 | 33.6 |
| Identif. Prod. | 93.8 | 91.6 | 91.7 | 87.0 |

Testing Conditions:
Feed: West Texas Heavy Gas Oil (WTHGO)
T = 500° C., WHSV = 16 h$^{-1}$, c/o = 3.02

By ion exchanging zeolite Beta with Zn and Ga the amount of paraffins is decreased, the amount of olefins is decreased, and the amount of aromatics is dramatically increased in the heavy gasoline. For the Ga-exchanged Beta catalyst the total aromatic yield increase is up by 28% and by 38% for the Zn-exchanged Beta catalyst.

It is understood that the foregoing detailed description is given merely by way of illustration and that many variations may be made therein without departing from the spirit of this invention.

What is claimed is:

1. In a process for producing gasoline from a hydrocarbon feed under FCC conditions, the improvement comprising substantially increasing the aromatic content of the gasoline by using a catalyst comprising zeolite Beta containing between 0.1 and 15 wt % based on the weight of the zeolite of a metal selected from the group consisting of Ga, Zn and mixtures thereof.

2. A process according to claim 1, wherein the metal is ion-exchanged onto the zeolite Beta.

3. A process according to claim 1, wherein the metal is impregnated or deposited onto the zeolite Beta.

4. A process according to claim 1, wherein the catalyst has a particle size less than about 200 micrometers.

5. A process according to claim 4, wherein the catalyst has a particle size between about 30 and 120 micrometers.

6. A process according to claim 1, wherein the catalyst further comprises an inorganic oxide matrix binder.

7. A process according to claim 6, wherein the binder is selected from the group consisting of silica, alumina, silica-alumina sol, silica-alumina gel, clay, particulate alumina and mixtures thereof.

8. A process according to claim 1, wherein the catalyst further comprises at least one additional catalytically active zeolite component.

9. A process according to claim 8, wherein said additional zeolite is selected from the group consisting of type Y faujasite, ultrastable Y, rare-earth exchanged Y, calcined rare-earth exchanged Y, PCY, and mixtures thereof.

10. A process according to claim 1, wherein the metal loaded zeolite Beta comprises from 1 to 80 wt % of the catalyst.

11. A process according to claim 10, wherein the metal loaded zeolite Beta comprises from 5 to 40 wt % of the catalyst.

* * * * *